(12) United States Patent
Yoshimura et al.

(10) Patent No.: US 7,380,343 B2
(45) Date of Patent: Jun. 3, 2008

(54) CUTTING TOOL

(75) Inventors: Takayoshi Yoshimura, Anjo (JP);
Tomonobu Nashimoto, Anjo (JP); Yuki Wada, Anjo (JP); Kouji Matsubara, Anjo (JP)

(73) Assignee: Makita Corporation, Anjo (JP)

( * ) Notice: Subject to any disclaimer, the term of this patent is extended or adjusted under 35 U.S.C. 154(b) by 32 days.

(21) Appl. No.: 11/226,344

(22) Filed: Sep. 15, 2005

(65) Prior Publication Data
US 2006/0065097 A1 Mar. 30, 2006

(30) Foreign Application Priority Data
Sep. 24, 2004 (JP) ............... 2004-277886

(51) Int. Cl.
*B23D 47/02* (2006.01)
(52) U.S. Cl. ................. 30/388; 30/390; 83/100; 83/170
(58) Field of Classification Search ............ 83/651, 83/170, 171, 100; 30/388, 124, 390, 391; 144/252.1; 451/488, 456, 457, 358, 359
See application file for complete search history.

(56) References Cited

U.S. PATENT DOCUMENTS

| | | | |
|---|---|---|---|
| 2,789,404 A * | 4/1957 | Downing et al. ........... | 451/456 |
| 3,873,862 A | 3/1975 | Butler | |
| 4,192,104 A * | 3/1980 | Patenaude ................... | 451/456 |
| 4,675,999 A * | 6/1987 | Ito et al. ....................... | 30/124 |
| 5,084,972 A * | 2/1992 | Waugh ......................... | 30/124 |
| 5,327,649 A | 7/1994 | Skinner | |
| 5,634,274 A * | 6/1997 | Ohkouchi et al. ............ | 30/124 |
| 5,675,895 A * | 10/1997 | Mori et al. ................... | 30/124 |
| 5,701,676 A * | 12/1997 | Itoh ............................. | 30/388 |
| 6,108,912 A | 8/2000 | Radigan | |
| 7,103,979 B2 * | 9/2006 | Yoshida et al. ............... | 30/376 |
| 2005/0262706 A1 | 12/2005 | Yoshida et al. | |

FOREIGN PATENT DOCUMENTS

| | | |
|---|---|---|
| DE | 103 49 088 A1 | 9/2004 |
| JP | U 05-005332 | 1/1993 |
| JP | A 11-058305 | 3/1999 |
| JP | A 2004-142169 | 5/2004 |
| JP | A 2004-154872 | 6/2004 |

* cited by examiner

*Primary Examiner*—Boyer D. Ashley
*Assistant Examiner*—Omar Flores-Sánchez
(74) *Attorney, Agent, or Firm*—Oliff & Berridge, PLC (57) ABSTRACT

A cutting tool that maintains a compact-sized main body without affecting the usability as well as the dust collecting operation is provided. In a dust cover mounted on a blade case, a dust collection route divided from a saw blade is formed, and an outlet is provided at the rear side of the blade case in the cutting direction. Moreover, the blade case includes a peripheral surface in which an inlet and an auxiliary inlet are provided for guiding air generated by the rotation of the saw blade into the dust collection route from the front side in the cutting direction. Further, a guiding route where a part of cooling air for the motor is introduced into the dust collection route by means of a duct is provided, whereby the cooling air as well as air guided from the inlet is introduced into the dust collection route.

15 Claims, 7 Drawing Sheets

CUTTING TOOL

BACKGROUND OF THE INVENTION

This application claims the benefit of Japanese Patent Application Number 2004-277886 filed on Sep. 24, 2004, the entirety of which is incorporated by reference.

1. Field of the invention

The present invention relates to a cutting tool, such as a cutter which cuts a workpiece with a circular cutting blade or a circular saw.

2. Description of the Related Art

A conventional circular saw has a base which is rectangular in a plain view and a main body provided on the base and having a circular saw blade (cutting blade) driven to rotate by a motor. With a condition that the saw blade protrudes below the base, the base is slid on the workpiece, whereby the workpiece is cut by the saw blade. In this circular saw the front end of a blade case covering the upper part of the saw blade is rotatably mounted to the base. On the other hand, the rear end of the blade case can be fixed at an arbitrary position along an arcuate depth guide standing on the base. In this configuration, an amount of protrusion of the saw blade (cutting depth) from the base can be adjusted by changing the engaged position with respect to the depth guide.

In this kind of circular saw, during cutting operation chips generated from the workpiece flow out to cause a problem of recognizing a black cut line, which deteriorates the working environment. In order to solve the above problem, as described in the Japanese laid-open utility model publication No. 5-5332 and the Japanese laid-open patent publication No. 11-58305, technology is applied in which a blade case covering the upper part of a saw blade is provided with the main body. For details, the blade case is provided with a dust collection route which guides chips backward along the circumference of the saw blade and discharges the chips from the exhaust port provided at the rear side of the blade case, thereby preventing the chips from being dispersed.

In such a dust collection route, since chips are easily clogged in the dust collection route, the route has to be wide in order to prevent the clogging. Because of this, a large blade case is required, which obstructs downsizing of the main body and deteriorates usability. In addition, in a circular saw having a depth guide for adjusting the cutting depth, the depth guide is generally housed in the blade case to prevent the deterioration of the appearance. That is, when the depth guide is provided at the outside of the blade case, increased convex or concave parts might be observed. Since the depth guide is housed in the blade case, the airflow generated by rotation of the saw blade could be disturbed by the depth guide, which lowers the dust collecting operation. Further, another problem occurs, that is, chips might be scattered during cutting depth adjustment as they are adhered to the depth guide.

In order to solve the above problems, an object of the present invention is to provide a cutting tool maintaining a compact-sized main body while ensuring excellent usability and dust collecting operation.

SUMMARY OF THE INVENTION

In order to achieve the above object, according to a first aspect of the present invention a dust collection route which is divided from a cutting blade is provided along the circumference of the cutting blade on the upper side of a blade case. Further, at the division portion between the dust collection route and the cutting blade an inlet in which airflow generated by rotation of the cutting blade can be introduced into the dust collection route from the front side of the blade in the cutting direction is provided. On the other hand, an outlet which discharges the air in the dust collection route to the outside of a main body is provided at the rear side of the dust collection route in the cutting direction. Moreover, a guiding means which introduces cooling air for a motor into the dust collection route is provided with the main body.

According to a second aspect of the present invention, in addition to the object of the first aspect, in order to improve dust collection efficiency, an auxiliary inlet which communicates the dust collection route with the side of the cutting blade is provided at the downstream of the inlet formed at the division portion between the dust collection route and the cutting blade.

According to a third aspect of the present invention, in addition to the object of the first or second aspect, in order to utilize cooling air efficiently and improve operability, a diverging means is provided by which part of cooling air guided into the dust collection route through the guiding means is discharged to the front end of a base in the cutting direction.

According to a fourth aspect of the present invention, in addition to the object of any of the first to third aspects, in order to prevent clogging by chips more effectively, a rib is provided along and close to the cutting blade in the inlet. The rib has an inclined portion at the peripheral end of the cutting blade's side, which extends closer to the cutting blade in the downstream direction. The end of the inclined portion overlaps with the cutting blade in the orthogonal direction with respect to the cutting blade.

According to the first aspect of the present invention, dust collection without dust dispersion can be conducted effectively by utilization of the dust collection route. In particular, cooling air for the motor, in addition to air generated by cutting blade rotation, is used to discharge chips, thereby preventing clogging by chips effectively in the dust collection route. Consequently, the dust collection route can be formed narrower, which allows the main body to be downsized and ensures an excellent operability. Moreover, even when a depth guide for adjusting the cutting depth is provided, the depth guide does not affect dust collecting operation since it can be housed in the blade case separated from the dust collection route.

According to the second aspect of the present invention, in addition to the effect of the first aspect, air generated by cutting blade rotation in the blade case is added in the middle of the dust collection route. By this addition, airflow in the dust collection route becomes smooth and chips which do not pass the inlet can be collected at the auxiliary inlet at the downstream side to be guided into the dust collection route, thereby improving dust collection efficiency.

According to the third aspect of the present invention, in addition to the effect of the first or second aspect, cooling air can be utilized efficiently and the cutting position can be surely observed, thereby improving operability.

According to the fourth aspect of the present invention, in addition to the effect of any of the first to third aspects, stringlike chips are cut to be smaller and guided into the dust collection route, which prevents clogging by chips effectively.

DETAILED DESCRIPTION OF THE PREFERRED EMBODIMENT

Hereinafter, an embodiment according to the present invention is described based on the drawings.

Figure 1:
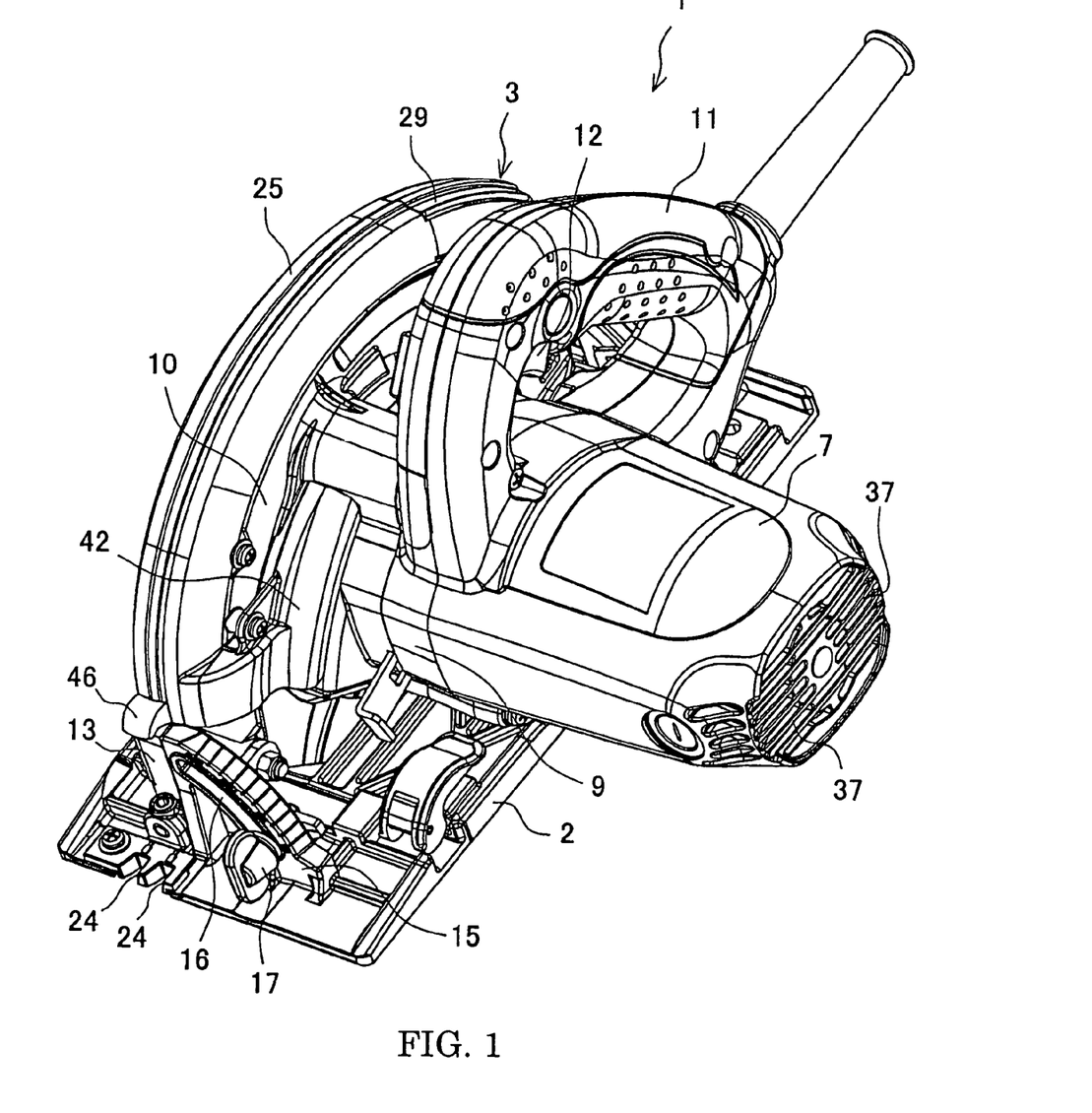
FIG. 1 is a perspective view of a circular saw.
Figure 2:
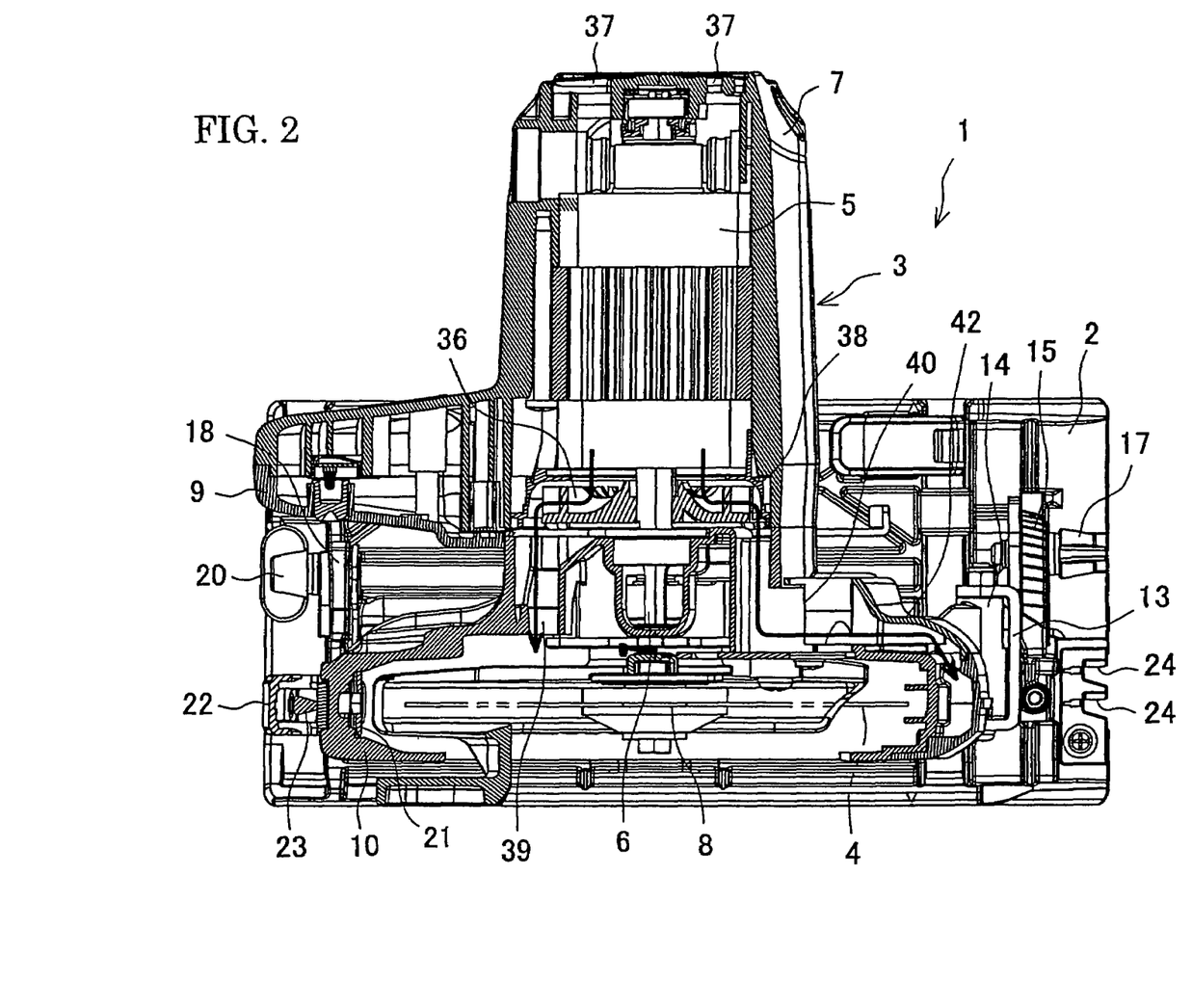
FIG. 2 is a horizontal sectional view at the center portion of a saw blade of the circular saw.

FIG. 1 is a schematic view of a circular saw as one example of a cutting tool according to the present invention and FIG. 2 is a horizontal sectional view thereof. A circular saw 1 described herein has a base 2 which is rectangular in a plain view and a main body 3 provided on the base 2 and having a circular saw blade 4 as a cutting blade driven to rotate by a motor 5. The main body 3 includes a motor housing 7 accommodating the motor 5, a handle housing 9 in conjunction with the motor housing 7 to form a handle 11, and a blade case 10 covering the upper part of the saw blade 4. The blade 4 is connected orthogonally to the end of a spindle 8. The spindle 8 is pivotally supported in the blade case 10 so as to be parallel to an output shaft 6 of the motor 5 for transmitting the rotation from the output shaft 6. The reference number 12 denotes a trigger switch provided with the handle 11.

Figure 3:
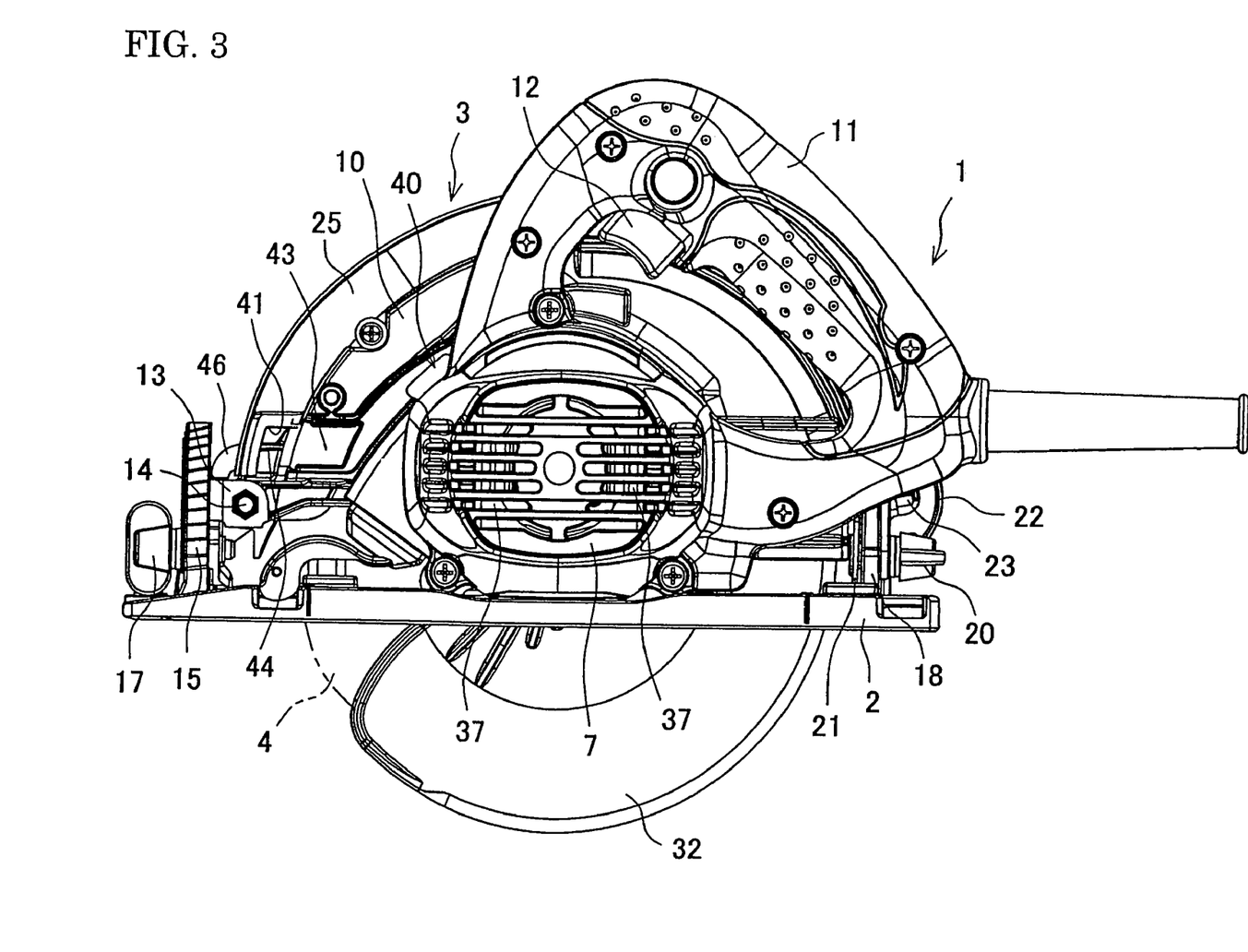
FIG. 3 is a rear side view of the circular saw (a duct is removed).

The blade case 10 is provided with the base 2 through a connecting plate 13 on the front side of the base 2 in the cutting direction (in the right direction of FIG. 2). The connecting plate 13 having an open-boxed shape in a plain view is mounted to the blade case 10 by means of an axis 14 so that the blade case 10 can rotate in the upper or lower directions. The connecting plate 13 is coupled to a sector guide plate 15 standing on the base 2 and having an arcuate guide groove 16, whereby the blade case 10 can be fixed at an arbitrary position along the guide groove 16 by means of a threaded fastener 17. At the rear side of the blade case 10, a depth guide 21 curved in an arc toward the front is provided. The depth guide 21 is coupled to a sector guide plate 18 standing on the base 2 and having an arcuate guide groove 19 shown in FIG. 7. With this configuration, the blade case 10 can be fixed at an arbitrary position along the guide groove 19 by means of a threaded fastener 20 as shown in FIG. 3. This depth guide 21 is provided within the blade case 10 with play and connected to a bolt 23 penetrating through the blade case 10, whereby the blade case 10 is clamped by the bolt 23 and arbitrarily operated using a cam lever 22.

According to the above, in the main body 3 the protruding amount (cutting depth) of the saw blade 4 in the lower direction of the base 2 can be adjusted by rotation of the blade case 10 around the axis 14 to change a clamp position of the blade case 10 along the depth guide 21. Moreover, by changing engaging positions between the guiding plates 15, 18 provided at the front and the rear of the base 2, and the corresponding connecting plate 13 and depth guide 21 respectively, the main body 3 can be fixed at an arbitrary tilting angle. The tilting angle ranges from an orthogonal position where the saw blade 4 crosses the base 2 at the right angle to a maximum tilting angle where the main body is tilted to the right side at 45 degrees with respect to the base 2. At the front end of the base 2, there are provided notches 24, 24 whose lateral ends are positioned on the extending surfaces of the saw blade 4 at its orthogonal position and its tilted position at the angle of 45 degrees respectively. By matching a black cut line indicated on a workpiece with the lateral end of the notches 24, 24, cutting operation in accordance with the black cut line can be easily conducted.

Figure 4:
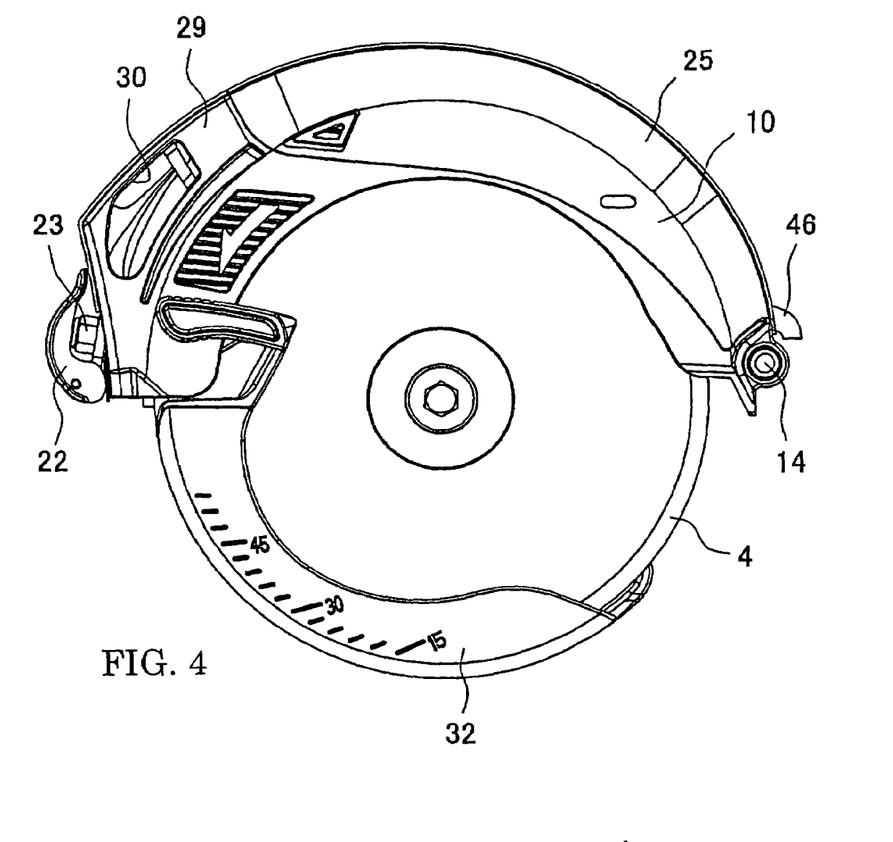
FIG. 4 is a front view of a main body where a base is omitted.
Figure 5:
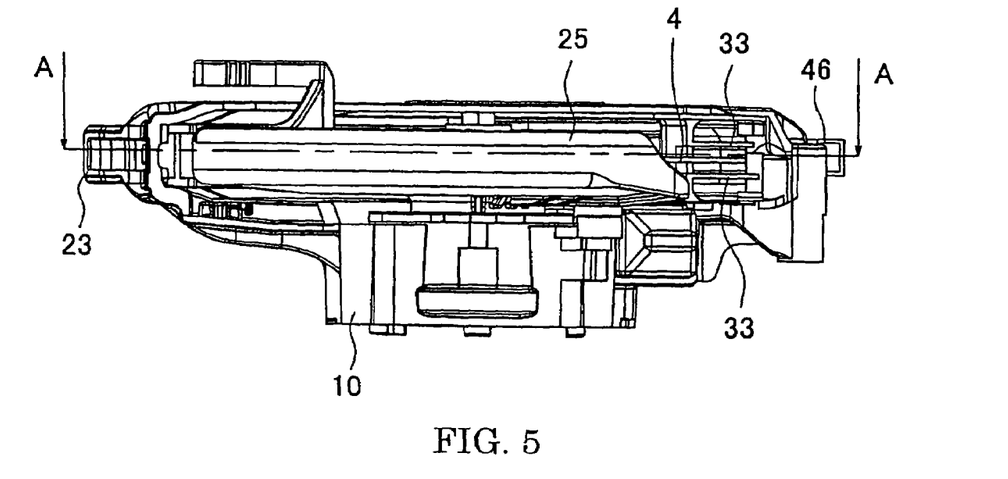
FIG. 5 is a plain view of a main body where the base is omitted.
Figure 6:
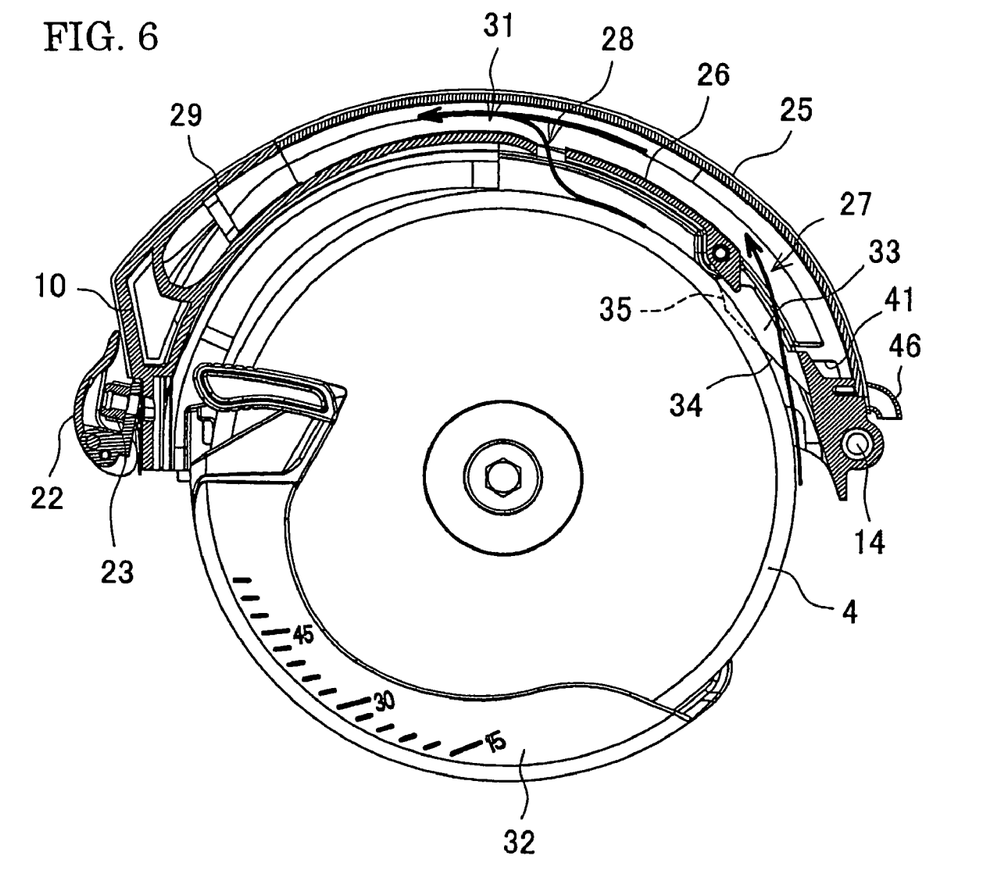
FIG. 6 is a sectional view taken along the line A-A of FIG. 5.
Figure 7A:
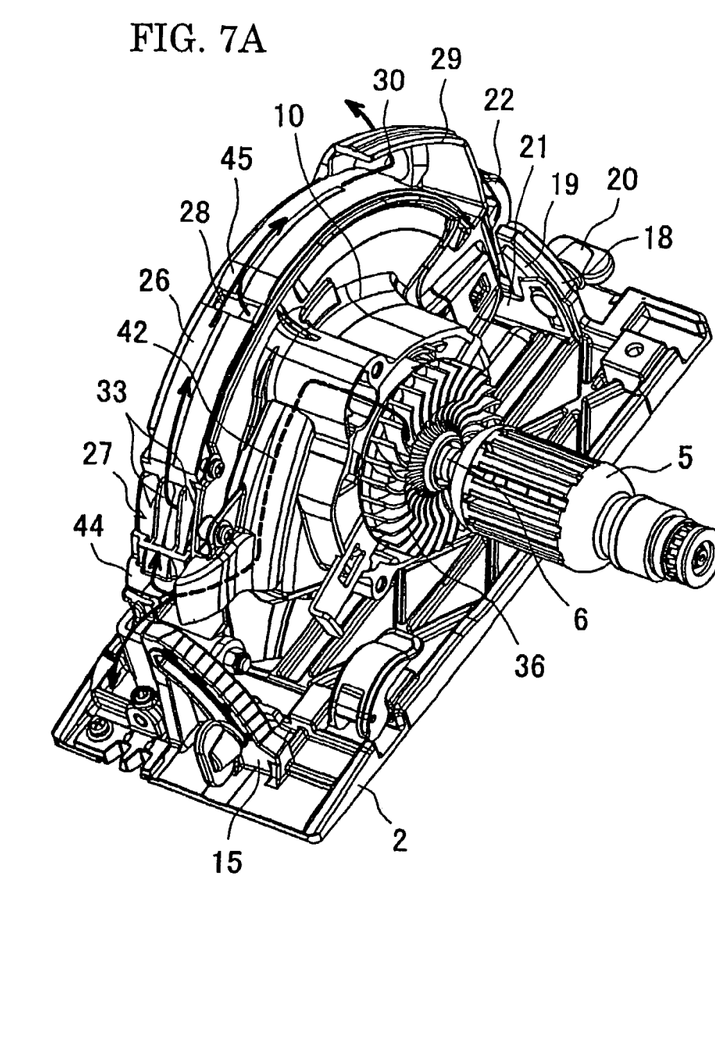
FIG. 7A is a perspective view of a circular saw where a dust cover and a motor housing are removed.
Figure 7B:
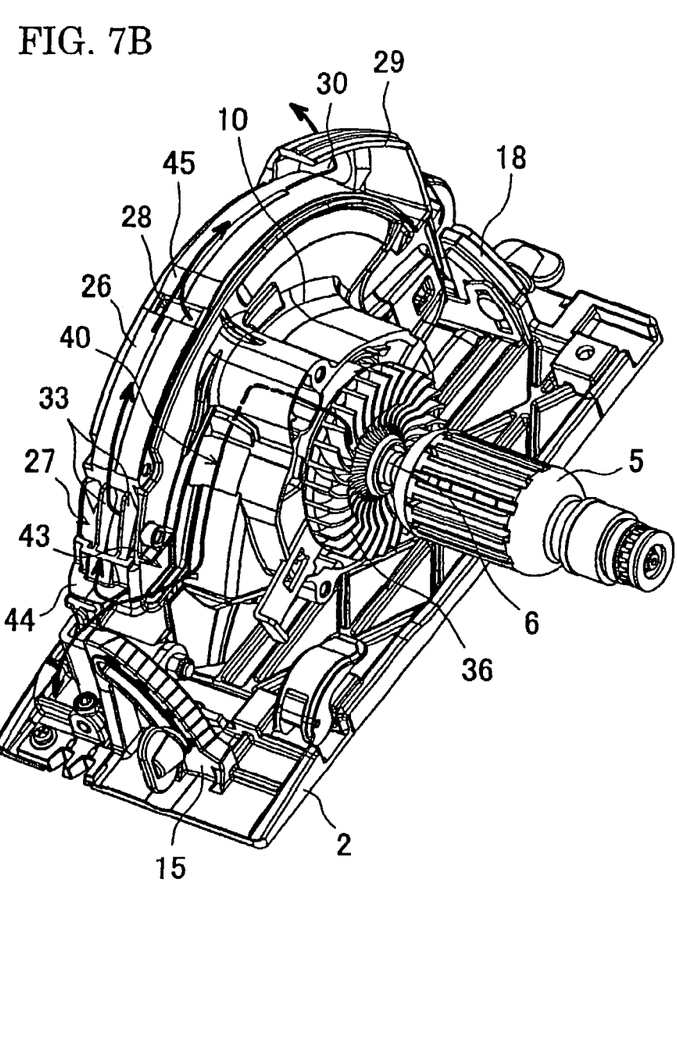
FIG. 7B is a perspective view similar to FIG. 7A except that a duct is further removed.

As shown in FIGS. 4-6, a dust cover 25 is threadedly mounted along the circumference of the saw blade 4 on the blade case 10. The dust cover 25 has an open-boxed sectional view and extends from an area adjacent to the front axis portion to the rear side. As shown in FIG. 7, on a peripheral surface 26 which is a division portion between the dust cover 25 and the saw blade 4, an inlet 27 and an auxiliary inlet 28 are formed. The inlet 27 is located at an area adjacent to the axis portion of the blade case 10, and the auxiliary inlet 28 is located substantially right above the rotating center of the saw blade 4. This structure allows the inside of the blade case 10 to communicate with the inside of the dust cover 25. Moreover, at the rear side of the blade case 10, a connecting portion 29 which is coupled to the rear end of the dust cover 25 and having an outlet 30 is provided. With this configuration, the main body 3 has a dust collection route 31, in which air generated at the front side of the saw blade 4 in the tangential direction is guided into the dust cover 25 through the inlet 27 and the auxiliary inlet 28, and moves rearward in the dust cover 25 along the circumferential direction of the saw blade 4 until it is discharged through the outlet 30 to the front side.

The reference number 32 denotes a safety cover which is rotatably mounted within the blade case 10 so as to be concentric with the saw blade 4. In a normal state, the safety cover 32 is biased at a rotating position as shown in FIG. 4 in which it covers the lower part of the saw blade 4 except the front portion thereof below the base 2. During cutting operation, the safety cover 32 is rotated in the direction in which the saw blade 4 is exposed by abutting on the workpiece to be housed in the blade case 10 at an inner area of a peripheral surface 26 of the blade case 10.

Figure 8:
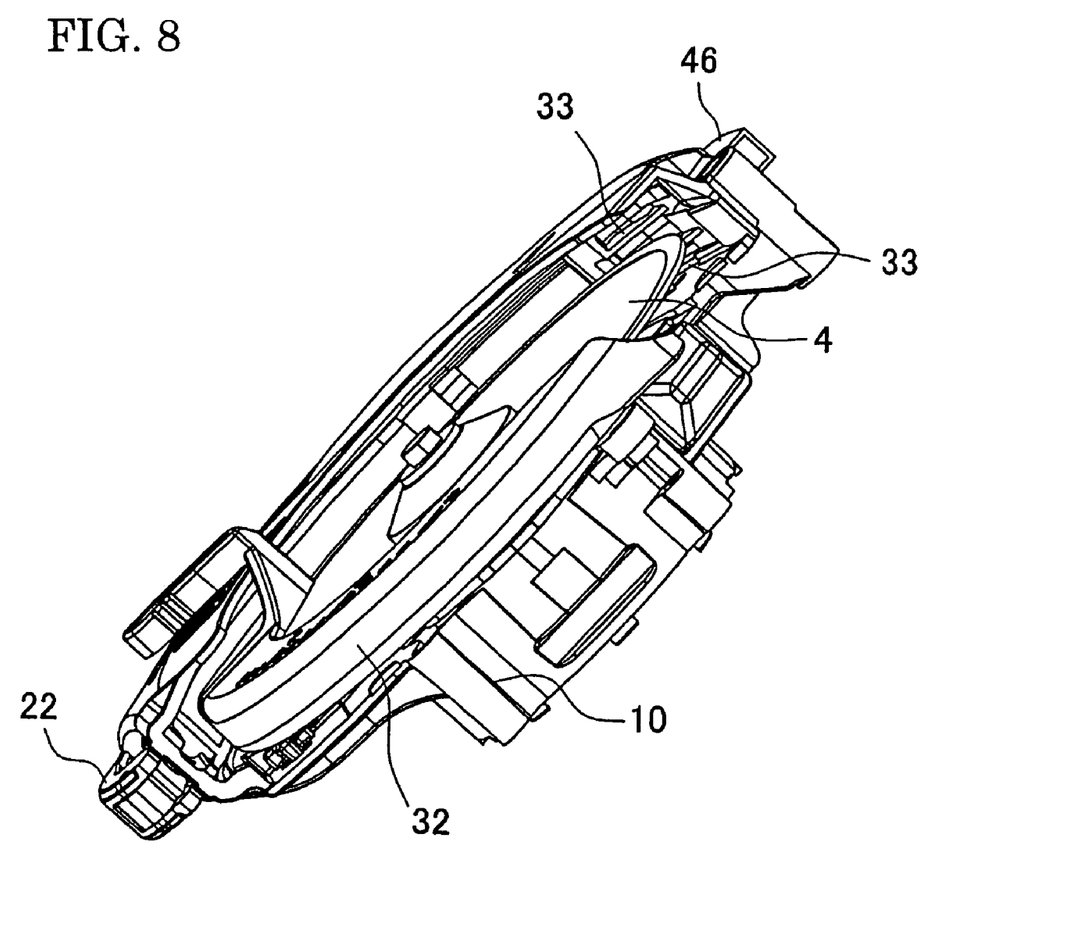
FIG. 8 is a perspective view of a blade case portion viewed from the bottom.

As shown in FIGS. 6-8, in the inlet 27 of the blade case 10, a pair of ribs 33, 33 are provided so as to be parallel to the saw blade 4 and have substantially bilateral symmetry about the saw blade 4. The ribs 33, 33 have a V-shaped peripheral end on the blade's 4 side, comprising a long first inclined portion 34 and a short second inclined portion 35. The first inclined portion 34 extends closer to the center of the saw blade 4 in the upper direction, while the second inclined portion 35 extends from the end of the first inclined portion 34 so that it recedes from the center of the saw blade 4 in the upper direction. The end of the first inclined portion 34 protrudes toward the saw blade 4 so as to overlap with the saw blade 4 in the lateral direction.

Moreover, the auxiliary inlet 28 is located slightly in front of the end of the depth guide 21 when the saw blade 4 protrudes to a maximum amount, which prevents the depth guide 21 from closing the auxiliary inlet 28. Further, the rear part of the auxiliary inlet 28 on the peripheral surface 26 is an inclined portion 45 extending closer to the saw blade 4 in the forward direction.

In the motor housing 7, the output shaft 6 of the motor 5 includes a fan 36 for cooling the motor 5. In accordance with the rotation of the output shaft 6, cooling air for the motor 5 can be introduced into the fan 36 through intake ports 37, 37 . . . provided at the end of the motor housing 7. At the air intake side of the fan 36, a tray-shaped baffle plate 38 having a hole at its center is provided. With this baffle plate 38, cooling air passed through the motor housing 7 is guided to the blade case's 10 side and discharged from a plurality of outlets 39, 39 . . . which open toward the inner side of the blade case 10.

The blade case 10 has an opening 40 which is located at the lateral front portion thereof on the side of a cylindrical portion connected to the motor housing 7. On the other hand, the dust cover 25 has a connecting port 41 at the lateral portion on the side of the motor housing 7. Then, a semi-cylindrical duct 42 communicating the opening 40 with the connecting port 41 is mounted so as to cover the outer surfaces of the blade case 10 and the dust cover 25. With this configuration, a guiding route 43 as a guiding means is provided in which the cooling air is guided from the opening 40 to the connecting port 41 along the outer surface of the blade case 10. As described above, since the outer wall of the blade 10 is utilized as a part of a cylindrical inner wall of the duct 42, an efficient design having little protrusion can be established. As a result, a user can clearly observe an area including the notch 24 of the base 2.

It should be noted that a horizontal separation plate 44 which bifurcates the connecting port 41 into the upper and lower portions is provided on the peripheral surface 26 of the blade case 10 at the opening position of the connecting port 41. This separation plate 44 bifurcates cooling air, which is guided from the guiding route 43 into the dust cover 25, to the upper and lower directions. Further, a cylindrical nozzle 46 is provided at the lower part of the separation plate 44 on the dust cover 25. The nozzle 46 protrudes forward and opens downward.

In the circular saw 1 as configured above, when the base 2 is placed on a workpiece and the trigger switch 12 is pressed to drive the motor 5, the saw blade 4 starts to rotate in the rotating direction as shown in FIG. 4 via a spindle 8. In this state, the base 2 is slid forward, so that the workpiece is cut by the saw blade 4.

In this cutting, chips produced at the front end of the saw blade 4 are dispersed substantially upward along the tangential direction of the saw blade 4 in the blade case 10 by a biasing force generated from the rotation of the saw blade 4 and airflow generated in accordance with the rotation. However, as shown by an arrow in FIG. 6, the chips are guided into the dust cover 25 through the inlet 27 provided with the peripheral surface 26, and moved backward passing through the dust collection route 31 to be discharged to the lateral sides from the outlet 30. The chips which do not pass the inlet 27 are moved backward along the circumference of the saw blade 4 and introduced into the dust cover 25 through the auxiliary inlet 28 to flow into the dust collection route 31.

Further, when a wooden workpiece is cut, elongated or stringlike chips might be generated if they are cut with the grain or the saw blade 4 is blunt. Even in this case, the stringlike chips can be chopped in contact with the saw blade 4, because they are easily caught by the first inclined portions 34, 34 of the ribs 33, 33 during passing through the inlet 27 and they move along the inclined portions 34, 34 toward the saw blade 4 with airflow generated by the saw blade 4. Once the stringlike chips are chopped to smaller chips, they are guided into the dust collection route 31. Alternatively, some stringlike chips are caught by the saw blade 4 and moved along the saw blade's 4 side of the peripheral surface 26. Then, they are discharged without being guided into the dust collection route 31. In this way, clogging by the wood chips in the cover 25 can be prevented even if stringlike chips are generated. Moreover, since the ribs 33, 33 are parallel to the saw blade 4, rectification of airflow passing through the inlet 27 can also be obtained.

On the other hand, by means of the fan 36 cooling air is taken into the housing 7 in accordance with rotation of the motor 5. As shown by an arrow in FIG. 2, some of the cooling air is discharged into the blade case 10 from the outlet 39, while some moves in the guiding route 43 formed in the duct 42 through the opening 40 and is guided into the dust cover 25 through the connecting port 41. Here, as shown by an arrow in FIG. 7, air which flows into the upper portion of the separation plate 44 of the connecting port 41 is introduced into the dust collection route 31 together with air which is generated by the saw blade 4 and guided from the inlet 27. On the other hand, air which flows into the lower portion of the separation plate 44 is discharged outside from the front end of the dust cover 25 through the nozzle 46 in the direction of the front end of the base 2. This lower air directed downward blows out chips in the notch 24 or on the black cut line, which enables a clear view of the cutting position. In particular, as airflow is generated as soon as the motor 5 initiates rotation, collection of chips in the notch 24 or on the black cut line is exactly precluded.

As described above, according to the circular saw 1 of the above embodiment, the dust collection route 31 which is divided from the saw blade 4 is provided along the circumference of the saw blade 4 on the upper side of a blade case 10. Further, at the peripheral surface 26 of the blade case 10 the inlet 27 in which airflow generated from rotation of the saw blade 4 can be introduced into the dust collection route 31 from the front side of the blade 4 in the cutting direction is provided. On the other hand, at the rear side of the cutting direction in the dust collection route 31, an outlet 30 which discharges the air in the dust collection route 31 to outside of the main body 3 is provided. Moreover, a guiding route 43 where air generated by the fan 36 to cool the motor 5 is introduced into the dust collection route 31 is provided with the main body 3.

Because of this configuration, the dust collection route 31 is utilized for an effective dust collection without dust dispersion. In particular, cooling air for the motor 5, in addition to air generated from rotation of the saw blade 4, is used to discharge chips, thereby preventing clogging by chips effectively in the dust collection route 31. Consequently, the dust cover 25 as well as the dust collection route 31 can be formed narrower, which allows the main body 3 to be downsized and ensures an excellent operability. Moreover, since the depth guide 21 can be housed in the blade case 10 separated from the dust collection route 31, the depth guide 21 does not affect dust collecting operation.

Moreover, an auxiliary inlet 28 which communicates the blade case 10 with the dust collection route 31 is provided at the peripheral surface 26 of the blade case 10 on the downstream side of the inlet 27. Through the auxiliary inlet 28, air generated by the saw blade's 4 rotation in the blade case 10 flows into the middle portion of the dust collection route 31. This configuration establishes a smooth airflow in the dust collection route 31 and chips which do not pass the inlet 27 can be collected by the auxiliary inlet 28 at the downstream side and guided into the dust collection route 31, thereby improving dust collection efficiency.

Further, the separation plate 44 is provided with which part of cooling air guided into the dust collection route 31 through the guiding route 43 is discharged to the front end of the base 2 in the cutting direction. With this separation plate 44, cooling air can be utilized efficiently and the cutting position can be surely observed, thereby improving operability.

Still further, ribs 33, 33 are provided so as to be parallel to the saw blade 4 in the inlet 27. Each rib has the first inclined portion 34 at the peripheral end of the cutting blade's 4 side. The first inclined portion 34 extends closer to the cutting blade 4 in the downstream direction, and the end of the inclined portion 34 overlaps with the cutting blade 4 in the orthogonal direction with respect to the cutting blade 4. In this state, stringlike chips are cut to be smaller and guided into the dust collection route 31, which prevents clogging by chips efficiently.

Although the outlet of the dust collection route is provided on the blade case's side in the above embodiment, the outlet may be provided on the dust cover's side. In addition, the outlet is not limited to a mere opening as that of the above embodiment, but it may be formed to be cylindrical so as to be connected to a hose from a dust collection apparatus. Further, the configuration of the dust cover is not limited to an open-boxed shape in a section view, but may be a cylindrical body to be connected to the blade case.

Still further, although the dust collection route is formed in the dust cover separated from the blade case, the dust collection route may be formed in the blade case by providing a partition along the circumference of the saw blade instead of the dust cover.

On the other hand, the inlet may be widened in the circumference direction of the cutting blade to obtain a broader opening area. If it is done, the auxiliary inlet may be omitted as long as a sufficient dust collection at the inlet is feasible.

In addition, the number of ribs at the inlet is not limited to two, that is, one or more than two ribs may be accepted. Moreover, the ribs may be inclined to be close to the cutting blade in the downstream direction, or another rib which is at right angles to the cutting blade may be added in the tangential direction of the cutting blade, although in the above embodiment the ribs are provided so as to be parallel to the cutting blade. Likewise, these modifications can be applied to the auxiliary inlet.

Further, the configuration of the guiding means is not limited to the configuration in which the guiding route is formed at the outside of the blade case utilizing the duct. Besides the above, a rib or a partition can divide the interior of the blade case if there is room therein, or a cylindrical duct from the motor housing can be directly connected to the dust collection route. Moreover, the cooling air can be led from the outer circumference side of the fan, and a position where the cooling air flows into the dust collection route may be optionally provided, for example, at the upstream of the inlet, at the position corresponding to the inlet, or at the downstream of the inlet. Among these, if the flowing position is provided at the upstream of the inlet as described in the above embodiment, air led from the inlet meets the cooling air smoothly, so that a complete preclusion of clogging by chips can be expected in the entire dust collection route.

Still further, it is possible that all of the cooling air, not a part thereof, is introduced into the dust collection route.

Moreover, the diverging means is not limited to the separation plate as described in the above embodiment. Alternatively, in accordance with the configuration of the duct or the guiding route, the diverging means can be structurally modified, such as a bifurcated cylindrical body or a bifurcated diverging means using a rib. Moreover, with respect to the allocation of each air route, a route for a dust collection route and a route for discharge to the front end of the base may be divided equally, or the former may be larger, and vice versa. In addition, a mere hole can be a substitute for the nozzle of the dust cover.

The present invention can adopt other cutting tools such as a cutter, not limited to a circular saw. Needless to say, it is not always necessary to include bevel cutting or cutting depth adjusting mechanism. Moreover, the present invention can be applied to not only AC cutting tools, but also DC cutting tools utilizing a battery pack as a power supply.

What is claimed is:

1. A cutting tool comprising:
    a base which is rectangular in a plane view;
    a main body provided on the base and having a circular cutting blade which is notatably driven by a motor and a blade case which covers an upper portion of the cutting blade; and
    a cooling means which leads cooling air from an outside of the main body to cool the motor in accordance with rotation of a fan provided at an output shaft of the motor; and
    wherein the cutting tool further comprises:
        a dust collection route which is divided from the cutting blade and provided along a circumference of the cutting blade on an upper side of the blade case;
        an inlet provided at a division portion between the dust collection route and the cutting blade for allowing airflow generated by rotation of the cutting blade to flow into the dust collection route from a front side of the cutting blade in the cutting direction;
        an outlet provided at a rear side of the dust collection route in the cutting direction for discharging the air in the dust collection route to the outside of the main body;
        a guiding means provided with the main body for introducing cooling air for the motor into the dust collection route;
        an auxiliary inlet at the downstream of the inlet provided at the division portion between the dust collection route and the cutting blade for commumcating the dust collection route with the front side of the cutting blade; and
        a diverging means by which part of cooling air guided into the dust collection route through the guiding means is discharged to the front end of the base in the cutting direction.

2. A cutting tool according to claim 1, wherein the rear part of the auxiliary inlet at the division portion is an inclined portion extending closer to the cutting blade in the forward direction.

3. A cutting tool according to claim 1, wherein a notch positioned on an extending surface of the cutting blade is provided at a front end of the base.

4. A cutting tool according to claim 1, wherein the blade case can be tilted at an arbitrary angle in a direction that is orthogonal to the base in the cutting direction.

5. A cutting tool according to claim 1, wherein a motor housing accommodating the motor is connected on a lateral side of the blade case and the cutting blade is provided so as to be orthogonal to an output shaft of the motor in the blade case.

6. A cutting tool according to claim 1, further comprising a rib provided so as to be parallel to and close to the cutting blade, wherein the rib has an inclined portion formed at the peripheral end of the cutting blade's side, and wherein the inclined portion extends closer to the cutting blade in the downstream direction until its end overlaps with the cutting blade in the orthogonal direction with respect to the cutting blade.

7. A cutting tool according to claim 6, further comprising a pair of ribs having line symmetry about the cutting blade.

8. A cutting tool according to claim 1, wherein the dust collection route is formed in a dust cover mounted on the blade case along the circumference of the cutting blade.

9. A cutting tool according to claim 8, wherein the guiding means comprises a semi-cylindrical duct provided along an outer surface of the blade case for communicating openings formed on both the blade case and the dust cover.

10. A cutting tool according to claim 9, wherein a diverging means comprises a separation plate which bifurcates an inside of the dust cover into an upper and lower portions at a connection portion of a duct.

11. A cutting tool according to claim 10, wherein a cylindrical nozzle protruding to a front end of the base and having an opening in the downward direction is mounted at a lower part of the separation plate on the dust cover.

12. A cutting tool according to claim 1, wherein the blade case is mounted on the base rotatably to an upper and lower directions at a front side of the base in the cutting direction, wherein the blade case is connected to the base to be fixed at an arbitrary position along an arcuate depth guide standing on the base at a rear side of the base in the cutting direction, and wherein a protruding amount of the cutting blade in the lower direction of the base can be adjusted by changing of an engaged position of the blade case along the depth guide.

13. A cutting tool according to claim 12, wherein the auxiliary inlet is located in front of an end of the depth guide when the cutting blade protrudes to a maximum amount.

14. A cutting tool according to claim 1, wherein a safety cover is rotatably provided at an inner side of the dust collection route so as to be concentric with the cutting blade in the blade case, and wherein when the cutting tool is not used, the safety cover is biased at a position where it covers a lower part of the cutting blade below the base.

15. A cutting tool according to claim 5, wherein the cooling means comprises an intake port provided at an end of the motor housing, a tray-shaped baffle plate is provided at an air intake side of the fan and having a hole at its center for guiding cooling air to a blade case's lateral side, and an outlet which opens toward an inner side of the blade case at the downstream of the baffle plate.

* * * * *